United States Patent [19]
Bennett et al.

[11] Patent Number: 5,256,177
[45] Date of Patent: Oct. 26, 1993

[54] METHOD FOR COATING OPTICAL FIBERS

[75] Inventors: Randy L. Bennett; Dale R. Powers, both of Painted Post, N.Y.

[73] Assignee: Corning Incorporated, Corning, N.Y.

[21] Appl. No.: 926,347

[22] Filed: Aug. 6, 1992

Related U.S. Application Data

[62] Division of Ser. No. 641,480, Jan. 15, 1991, Pat. No. 5,152,817.

[51] Int. Cl.$^5$ .............................................. C03C 25/02
[52] U.S. Cl. ........................................ 65/3.11; 65/12; 65/13; 65/60.6; 427/109; 427/249
[58] Field of Search ................ 427/249, 163, 109, 527; 65/3.1, 3.11, 12, 13, 60.6, 3.12

[56] References Cited

U.S. PATENT DOCUMENTS 4,402,993  9/1983  Aisenberg et al. ................... 427/527
4,863,760  9/1989  Schantz et al. ...................... 427/163
4,911,742  3/1990  Newbould et al. ............... 65/3.11 X
5,037,464  8/1991  Oohashi et al. ..................... 65/3.12

FOREIGN PATENT DOCUMENTS 0222960  5/1987  European Pat. Off. .

Primary Examiner—Robert L. Lindsay
Attorney, Agent, or Firm—W. J. Simmons, Jr.

[57] ABSTRACT

The invention concerns a method and apparatus for producing a carbon coated optical fiber. An optical fiber is drawn through a reactor tube. Reactant gas is flowed into the tube and onto the fiber where it reacts to form a carbon coating on the fiber. The reactant gas and reaction products are flowed in the direction of movement of the fiber and out of an end of the tube and into a receiving chamber having a diameter larger than that of the reaction tube. The reactant gas continues to react as it flows through the tube and after it exits the tube. At least some of the reaction product deposit on the surface of the receiving chamber where it has no adverse effect on the draw process.

16 Claims, 2 Drawing Sheets

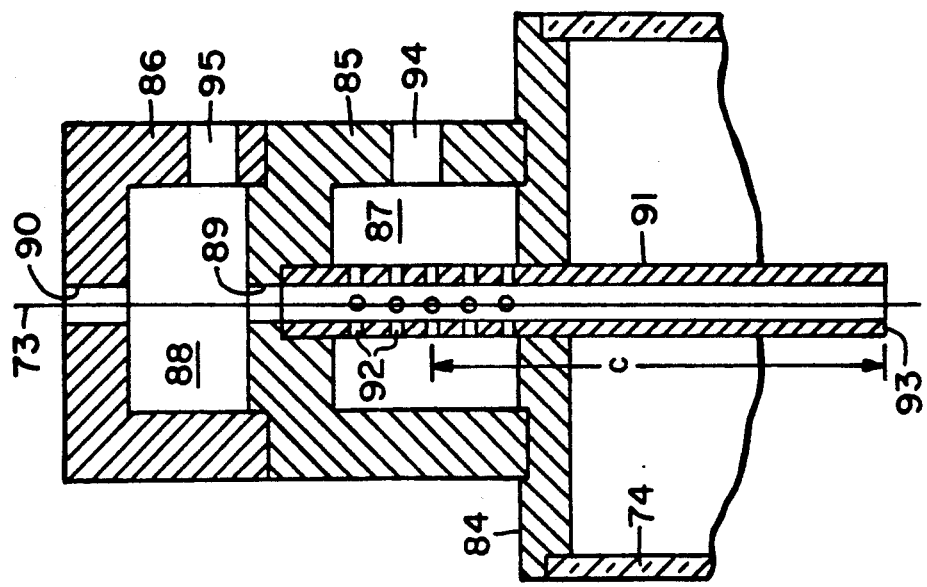
Fig. 4
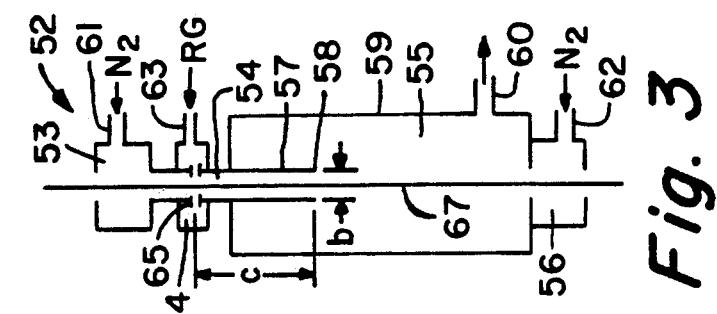
Fig. 3
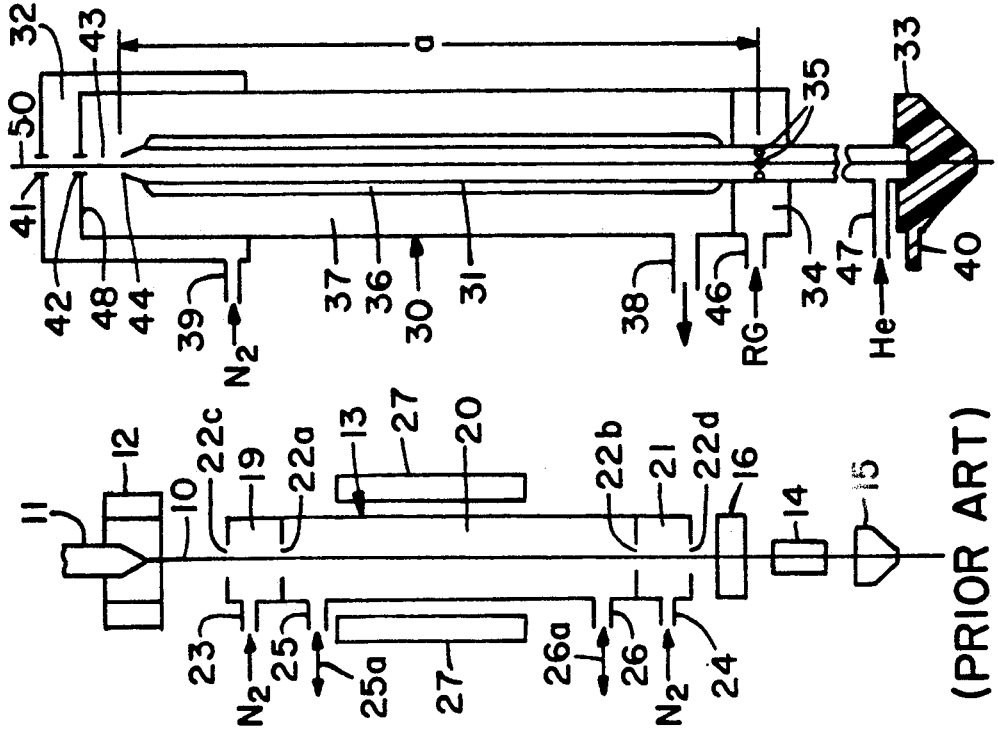
Fig. 2 (PRIOR ART)
Fig. 1 (PRIOR ART)

METHOD FOR COATING OPTICAL FIBERS

This is a division of application Ser. No. 07/641,480, filed Jan. 15, 1991 now U.S. Pat. No. 5,152,817, granted Oct. 6, 1992.

BACKGROUND OF THE INVENTION

This invention relates to hermetic coatings for optical fibers.

Optical fibers are conventionally provided with abrasion resistant coatings of resins such as silicone, polyurethane acrylate, or the like. Such coatings are typically applied on-line as the optical fibers are drawn so that surface abrasion is avoided during the fiber pulling process. There presently exist a variety of coatings which protect a fiber from abrasion but not from corrosion or hydrogen diffusion.

Various chemicals, including water, can react with a fiber, damaging its optical properties and weakening its mechanical strength and static fatigue resistance. Microcracks in a fiber surface present regions susceptible to chemical attack, especially when the fiber is under stress. Fiber stress tends to open a crack, thereby focusing the strain onto the chemical bonds at the tip of the crack. These strained bonds are more easily chemically attacked, thereby enabling corrosion to extend such microcracks. Growth of microcracks weakens the strength of a fiber producing static fatigue or sudden failure.

The effect of stress corrosion on $t_s$, the time to failure of an optical fiber under static stress, is determined in part by the crack velocity exponent n. Typically, a fiber having a large value of n also has a large value of $t_s$ under typical values of applied stress; if it doesn't break during a relatively short test period, it is certain to last for a long time under typical use conditions. For a discussion of optical fiber strength and fatigue characteristics, see K. E. Lu et al. "Mechanical and Hydrogen Characteristics of Hermetically Coated Optical Fiber" Optical and Quantum Electronics, vol. 22, (1990) pp. 227-237.

Diffusion of hydrogen into the fiber is detrimental to its optical performance. An attenuation increase may occur after an optical fiber has been installed, thereby creating the possibility that the system will be rendered at least temporarily inoperative.

The following test was employed to determine the permeability of carbon coatings to hydrogen. Fibers having 1 km lengths were placed in 85° C. chambers containing 11 atmospheres of hydrogen for 20 days. Attenuation was measured at the 1242 nm hydrogen absorption band, and the measured attenuation is an indication of whether the carbon coating is an effective hydrogen barrier. A hydrogen barrier factor of 0.2 dB/km, for example, means that the attenuation of the fiber increased by 0.2 dB/km at 1242 nm during the 20 day test. A hydrogen barrier factor of 0.02 to 0.2 dB/km after 20 days is considered good; less than 0.02 dB/km is considered excellent. Without a hydrogen barrier, the hydrogen absorption of a fiber will reach 50 dB/km in less than three days when exposed to 11 atmospheres of hydrogen at 85° C.

Metallic and ceramic coatings have been used with varying degrees of success with respect to the reduction of microcrack degradation. However such coatings are not sufficiently impermeable to hydrogen.

It has been known that carbon coatings can produce water resistant, high strength optical fibers (see U.S. Pat. No. 4,183,621 entitled "Water Resistant High Strength Fibers" issued to Kao et al. on Jan. 15, 1980). For various reasons, initial attempts at depositing carbon on optical fibers were unable to produce coatings that were impermeable to water and/or hydrogen and were unable to produce long lengths of coated fiber. For example, U.S. Pat No. 4,512,629 reports n was determined to be only 30.3 for a 300 Angstrom carbon coating deposited by sputtering and that the value of n was only 8 for the case of a 100 Angstrom carbon coating deposited on-line by chemical vapor deposition. A further disadvantage of prior art coating apparatus was its inability to produce carbon coated optical fiber at draw rates above 1 meter/sec. Various types of prior art coating apparatus are discussed below to illustrate these disadvantages.

FIG. 1 shows a typical prior art apparatus for depositing a coating of pyrolytic carbon on an optical fiber 10. Tractor means (not shown) pulls fiber 10 from the bottom tip of preform 11 which is heated by furnace 12. Included on the draw tower are carbon coating apparatus 13, fiber cooling tube 14 and coating means 15 where a coating of abrasion resistant material is formed on the fiber. A diameter measurement device may be located between the furnace 12 and apparatus 13. A device such as Q meter 16 may be located below apparatus 13 to measure the resistivity of the carbon coating on the draw and thereby provide an indication of coating continuity and thickness. Such contactless devices for electrically measuring the thickness of a coating are disclosed in U.S. Pats. Nos. 4,593,244 and 3,679,968. The resistivity of the coating on ends of the coated fiber can thereafter be measured off-line by a contact apparatus to calibrate the Q meter.

Apparatus 13 comprises a first isolation chamber 19, a reaction chamber 20 and a second isolation chamber 21. Chambers 19 and 20 are connected by a small-diameter opening 22a, and chambers 20 and 21 are connected by a small-diameter opening 22b. Isolation chambers 19 and 21, which isolate reaction chamber 20 from the ambient atmosphere, have small-diameter openings 22c and 22d, respectively. Inert gas flows through inlets 23 and 24 to chambers 19 and 21, respectively, to provide those chambers with a sufficient pressure to restrict the flow of atmospheric air into openings 22c and 22d. As indicated by double-headed arrows 25a and 26a, various types of prior art apparatus are designed such that the reactant gas has been flowed into either pipe 25 or pipe 26, and the reaction products have flowed out of the opposite pipe. In general, reactant gas is flowed toward one side of the fiber. Optical fiber 10 is introduced into apparatus 13 from opening 22c, passed through isolation chamber 19, reaction chamber 20 and the second isolation chamber 21, and it exits the apparatus through opening 22d.

At least some of the heat for the reaction is supplied by the heat of the drawn fiber. In the absence of auxiliary heating means, the fiber temperature in the reaction chamber is dependent upon the fiber diameter, the draw rate and upon 1/L, where L is the distance from the neck-down part of the fiber preform in the furnace. For low draw rates, for example, reaction rate or efficiency can be increased by heating the fiber prior to its entry into the reaction chamber or while it is in the reaction chamber, or by heating the reactant gas before it reaches the reaction zone. Heating coil 27 is illustrative of various types of auxiliary heating means. Techniques which preheat the gas can cause the reaction to occur at a location that is sufficiently remote from the fiber surface that an excessive deposition of carbon builds up on the apparatus. Such carbon buildup can occur at openings 22a and 22b and can therefore abraid and weaken the fiber. The products of such a reaction can flow through exhaust pipe 25 (or 26) and block filters or otherwise restrict flow, thereby unblancing process flow conditions. Also, particles can break away from the apparatus and fall through opening 22d to coater 15 where they become entraped in the resin coating and deteriorate the coated fiber.

Published European Patent Application EP 0 374 926 teaches that the raw material should be supplied to the reaction chamber under conditions that cause the reaction to proceed more effectively. That publication states: (a) when the reaction chamber diameter is too small, carbon soot is deposited on a surface of an inner wall of the reaction chamber so that a long length of fiber cannot be coated with good quality carbon, and (b) the gaseous raw material does not flow properly when the diameter of the reaction chamber chamber diameter is too large. It concludes that the diameter of the reaction chamber should therefore be at least 2.5 cm and preferably not larger than about 4 cm.

However, when the reaction chamber is designed in accordance with the present invention, substantially no carbon soot deposits on the inner wall when the inside diameter (ID) is about 1 cm or less. Indeed, reaction chamber diameters greater than about 1 cm generated an excessive amount of fluffy soot that became attached to many surfaces and clogged the reactor.

FIG. 2 shows a prior art reactor of the type disclosed in Japanese published Patent Application 83339-1987. Coating apparatus 30 includes reactant supply tube 31 and a pair of isolation chambers 32 and 33. Reactant gas RG is fed through feed chamber 34 and feed holes 35 to tube 31. Most of the length of tube 31 above feed holes 35 is surrounded by an evacuated chamber 36 which prevents the loss of heat. Reaction products flow through exhaust chamber 37 and outlet pipe 38.

As fiber 50 is drawn through apparatus 30, it pulls ambient air through openings 41 and 42 into region 43 located between tip 44 of tube 31 and opening 42. The intake of air through opening 41 is counteracted by liquid isolation chamber 33 which includes an intake opening 40 for supplying a liquid thereto. The liquid can be an abrasion resistant coating material in which case a coolant gas such as helium is flowed into pipe 47 to cool the fiber prior to its entry into the coating material. Chamber 32 is a gas isolation chamber having intake opening 39 for an inert gas such as nitrogen, a portion of which flows from opening 41 and helps to sweep air from fiber 50 as it enters the reactor.

In the apparatus of FIG. 2 reactant gas flows counter to the direction of fiber 50 for the relatively long distance a between holes 35 and tip 44, the gas temperature increasing with further flow. This heating of the reactant gas is enhanced by employing a relatively narrow tube 31, thereby causing the reactant gas to pass near the fiber. In an apparatus in which the distance a was about 16 cm, the diameter of tube 31 was 9 mm, and the diameter of tip 44 was 5 mm, a reaction occurring below tip 44 resulted in a carbonacious buildup that quickly filled tube 31. The type of reaction that occurred in apparatus 30 produced a form of carbon that was loose and fluffy. The formation of this buildup within tube 31 could be substantially eliminated by increasing the combined upward flow of reactant gas and helium to a flow rate sufficient to cause the reaction to move upwardly to region 43. All flows to and from the coating apparatus, i.e. the vacuum applied to pipe 38 and the flows of nitrogen, helium and reactant gas to inlets 39, 47 and 46, respectively, had to be carefully adjusted to optimize the process and cause the reaction to take place in region 43. Increasing reactant gas or helium flow caused the reaction to occur at a higher point. If the point of reaction was too high, carbon deposited on surface 48; if it was too low, carbon deposited on tip 44, such deposits occurring after relatively short runs. This resulted in the plugging of narrow openings through which fiber passes. The buildup finally touched the fiber and caused it to break. Furthermore, the hermetic properties of the fiber were affected by small changes in gas flow rates.

The reactor of FIG. 2 was relatively unstable in that it did not provide a reliable hermetic reaction. The reaction could not be stabilized until about 1 to 2 km of fiber was drawn; this initially produced fiber had to be discarded because of inadequate fatigue protection. The carbon coating was not uniform throughout a run; coating resistivity could be 11 k-ohm per cm length of fiber at the start of a run and 6 k-ohm/cm or less at the end of the run.

In order to produce usable fiber (having an n-value greater than 100 from the apparatus of FIG. 2, the coating resistivity had to be between 6 and 11 k-ohms/cm. Minimum reactant gas flow was required to provide a coating thickness sufficient to achieve the required resistivity. The maximum length of a run (total fiber produced by the apparatus of FIG. 2 before soot fouled the coater) was about 10 km. The average length of a run (total fiber produced before fouling) was 8 km, and the maximum length of usable fiber produced was between 6 and 8 km (some fiber was abraided).

This type of reaction chamber functioned better at low draw speeds because of the lower fiber temperature resulting from such draw speeds. At high draw speeds, i.e. greater than about 1 meter/sec, the fiber was sufficiently hot that it transfered too much heat to the upwardly flowing reactant gas, thereby exacerbating the undesirable buildup problem. The coating deposited at faster draw speeds gave some resistance to hydrogen permeation. The present invention yields fiber with a good hydrogen barrier without the harmful buildup which would terminate the draw process.

SUMMARY OF THE INVENTION

An object of the present invention to provide a method and apparatus for applying continuous, good quality hermetic coatings to long lengths of optical fiber without equipment clogging. Another object is to provide a method and apparatus for applying carbonaceous hermetic coatings to optical fibers that are being formed at relatively high draw rates.

One aspect of the invention concerns a method for producing a carbon coated optical fiber. An optical fiber is drawn from a heated glass body and through a reaction tube. Reactant gas is flowed into the tube and onto the fiber where it reacts, because of the heat of the fiber, to form (a) a carbon coating on the fiber and (b) reaction products. The reactant gas and reaction products flow in the direction of movement of the fiber and out of an end of the tube and into a controlled atmosphere. The reactant gas continues to react as it flows through the tube and after it exits the tube. The length of the tube is such that substantially no reaction product deposits in it.

The reactant gas can flow through a feed chamber and thereafter through gas feed means that directs one or more annular flows of reactant gas onto the fiber. The reactant gas can flow onto the fiber in a direction that is either orthogonal or non-orthogonal with respect to the fiber axis.

The controlled atmosphere into which the gases flow can be contained within a receiving chamber into which the fiber moves after it exits the reaction tube. The diameter of the receiving tube is larger than that of the reaction tube, whereby at least some of the reaction product deposit on the surface thereof where they have substantially no adverse effect on the fiber draw process.

When the fiber moves from the receiving chamber it can pass through an isolation chamber that restricts the flow of ambient air into the receiving chamber. Gases can be exhausted from the receiving chamber to establish favorable gas flow conditions within the reactant tube and receiving chamber.

Another aspect of the invention concerns an apparatus for producing a carbon coated optical fiber. There presently exists fiber draw equipment that includes the linear arrangement of source means for producing a drawn optical fiber, a reactor tube, means for applying an abrasion resistant coating to the fiber and means for drawing the fiber through the previously named components. In accordance with this invention, the reactor includes a reactor tube having a fiber inlet end toward the source means and an opposing fiber outlet end. The outlet end of the reactor tube communicates with the receiving chamber, the reactor tube preferably projecting into the receiving chamber. The inside diameter of the receiving chamber is larger than that of the reactor tube.

Means is provided for flowing into the reactor tube a hydrocarbon gas which is the reactant. The hydrocarbon gas is chosen to be a gas which is easily decomposed to yield a carbonaceous coating on the fiber. The reactor tube is sufficiently close to the source means that the temperature of the fiber in the reactor tube is sufficiently high to cause a reaction that forms (a) an adherent carbon coating on the fiber and (b) reaction product. Means is also provided for causing the reactant gas and reaction products to flow through the reactor tube, from the outlet end and into the receiving chamber.

The means for flowing reactant gas into the tube can comprise a gas feed chamber and means for receiving reactant gas from the gas feed chamber and directing one or more annular flows of reactant gas onto the fiber. The means for directing at least one or more annular flows can consist of a plurality of feed holes spaced around the circumference of the reactor tube. The receiving chamber can include isolation chamber means opposite the reactor tube for restricting the flow of ambient air into the receiving chamber and means for exhausting gases therefrom.

The inside diameter of the reactor tube is preferably between 0.3 and 1.0 cm. The dimensions of the reactor tube are preferably such that the distance between the outlet end of the tube and the means for flowing is between 3 and 10 cm. The inside diameter of the receiving chamber is preferably between 2.5 and 10 cm and the length of the receiving chamber is preferably between 10 and 50 cm.

BRIEF DESCRIPTION OF THE DRAWINGS

FIGS. 1 and 2 are schematic illustrations of prior art apparatuses for applying hermetic coatings to optical fibers.

FIG. 3 is a schematic illustration of a coating apparatus constructed in accordance with the invention.

FIGS. 4 and 5 are cross-sectional views of a first embodiment of the invention.

DESCRIPTION OF THE PREFERRED EMBODIMENTS

Figure 6:
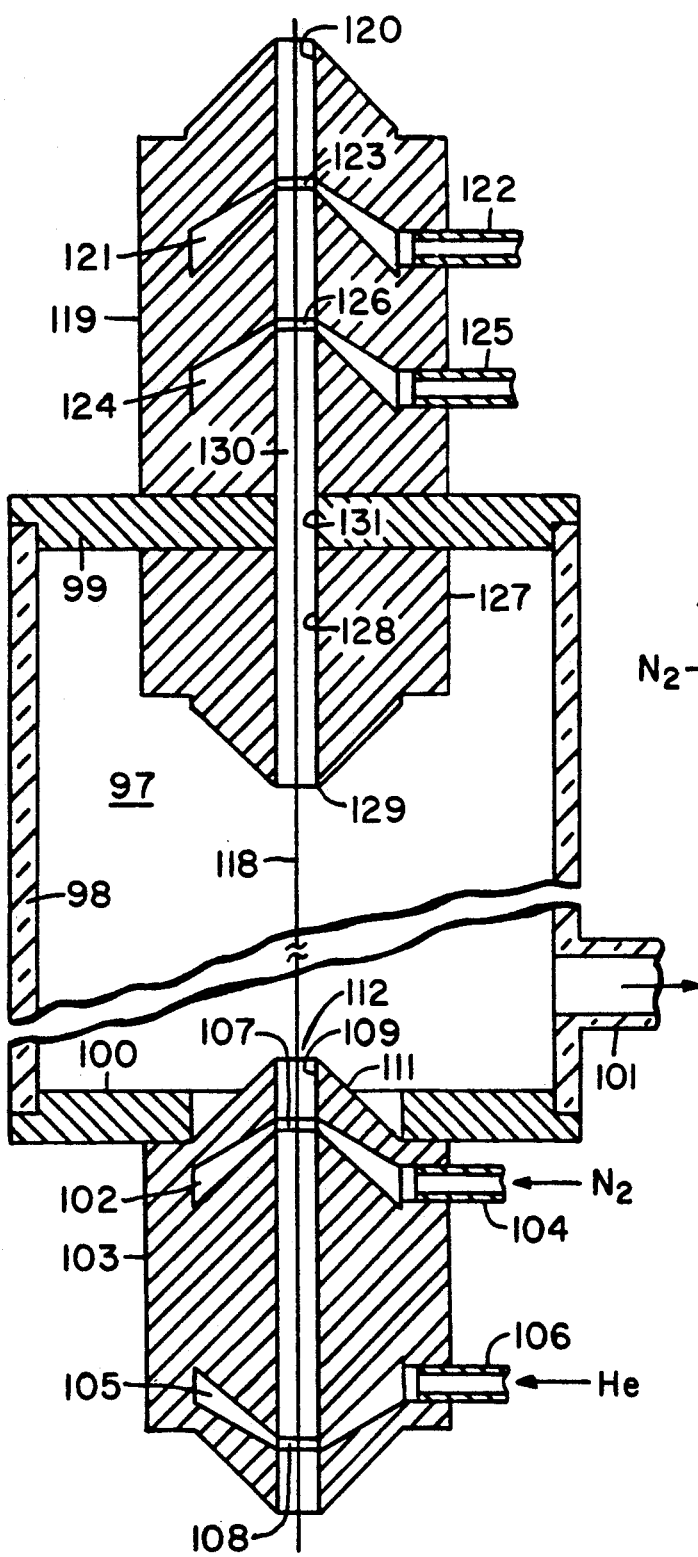
FIG. 6 is a cross-sectional view of a further embodiment.

The drawings are not intended to indicate scale or relative proportions of the elements shown therein.

Referring to FIG. 3, there is shown a coating apparatus 52 that is designed in accordance with the present invention. Apparatus 52 includes an upper isolation chamber 53, reaction chamber 54, receiving chamber 55 and lower isolation chamber 56. The reaction chamber is disposed within a tube 57 having a bottom tip 58. Receiving chamber 55 is disposed within a vessel 59 that is optionally provided with an outlet pipe 60 through which reaction products can be exhausted. Inlets 61 and 62 provide chambers 53 and 56, respectively, with an inert gas such as nitrogen. Reactant gas RG is supplied to chamber 54 by way of inlet 63, feed chamber 64 and feed holes 65.

Reactant gas is directed inwardly onto fiber 67 in either an annular flow or a plurality of jets that are spaced around the reaction chamber. The reactant flow can impinge upon the fiber at either a single axial location along the fiber (as schematically illustrated in FIG. 3) or at a plurality of axial locations. The reactant gas can be directed orthogonally with respect to the fiber or at an angle with respect to orthogonal. If the reactant gas is directed downwardly into chamber 54 at too small an angle with respect to the fiber, the gas flows too close to tube 57 and fails to form an adequate coating. Chamber 54 is relatively small in diameter so that the reactant gas is confined to a region relatively close to the fiber after it is introduced into the chamber. The diameter b of chamber 54 should be between about 0.3 cm and 1.0 cm, about 0.5 cm being preferred. The minimum diameter must be sufficiently large that the fiber does not contact the apparatus. For diameters greater than about 1.0 cm, the reactant gas is not efficiently transported to the fiber, and the reaction is unstable.

The gas introduction region defines the top of the reaction chamber, the fiber being hottest in that region. The reactant gas reacts immediately upon contacting the fiber. Unreacted gas and spent gases flow downwardly along with fiber through tube 57, the reaction continuing as the gases flow down that tube. The bulk of the reaction occurs in tube 57, and some reaction continues to occur within chamber 55. Some of the reaction products form the desired coating on the fiber.

Figure 3A:
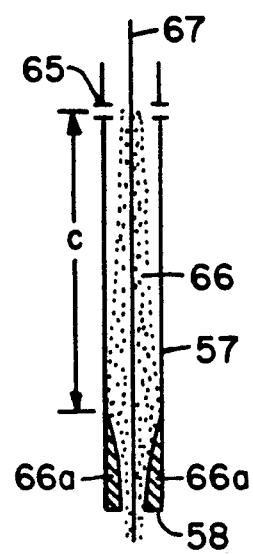
FIG. 3a schematic illustrates carbon buildup in a reaction chamber.

Some of the reaction products that form near the fiber surface continue to flow radially away from the fiber as they flow downwardly through tube 57. The reaction chamber must be sufficiently long to confine the reactants near the fiber for a sufficient axial length that an adequate coating thickness is formed. However, the length c between the average point of reactant gas injection and the bottom tip 58 must be short enough that there is no substantial buildup of reaction product within it. There may be a slight buildup of reaction product on the inside of tube 57 after one 100 km run, for example, a mild discoloration; however, this slight buildup is not substantial for the purpose of the invention. Referring to FIG. 3a, reaction product 66 initially forms near fiber 67 and continues to move away from the fiber as it flows toward tip 58. If tube 57 is too long, i.e. longer than length c, buildup 66a occurs. For a reactor tube 57 having a 1 cm ID, length c was typically about 5-6.5 cm. This length probably depends upon process parameters such as fiber temperature, reactor tube diameter, reactant gas flow rate and the like.

After the reaction products exit tube 57, they separate further from the fiber surface as they enter receiving chamber 55. The reaction products deposit on the chamber walls where the buildup does not interfere with the fiber drawing or coating process. If the ID of vessel 59 is at least about 2.5 cm, the reaction product buildup will not be a problem. There is no advantage to having an excessively large vessel 59; a diameter of about 10 cm is considered to be a practical upper limit. The receiving chamber length should be at least 10 cm to allow the reaction products to separate from the fiber. A length of 50 cm is a practical maximum length, and a length of about 25 cm is preferred. An oily film forms on the sides and bottom of vessel 59. As the process continues, the film thickens and chars to a solid black coating. This solid layer causes no detrimental effect. However, if chamber 55 is shorter than 10 cm, the reaction products tend to collect on the wall and bottom of vessel 59 and plug the passage to chamber 56.

After each run of over 100 km, the reactor is removed from the draw tower and disassembled. Vessel 59 is cleaned after each such run. Tube 57 need not be cleaned until it has been used for at least two 100 km runs. These devices are cleaned by heating them in air to oxidize the buildup.

Chamber 55 functions as a means for confining a controlled atmosphere. The salient feature of this atmosphere is its minimal oxygen content. If the hot carbon coated fiber exited tube 57 into air, for example, the resulting oxidation would damage the carbon coating. Perhaps a controlled atmosphere could also be provided by directing flows of inert gas onto the fiber as it exits tube 57.

Figure 5:
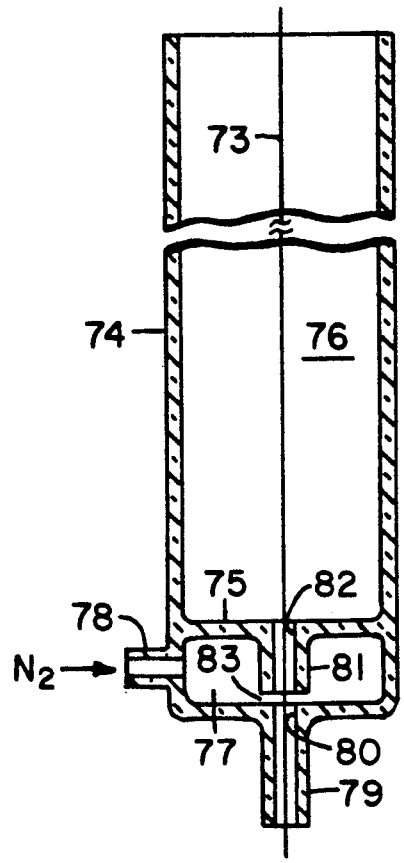

A preferred embodiment is shown in FIGS. 4 and 5 wherein a vessel having side wall 74, bottom wall 75 and cover 84 forms receiving chamber 76. Isolation chamber 77 has an inlet 78 for supplying inert gas thereto. A short tube 79 is connected to outlet opening 80. A tube 81 extends from opening 82 in vessel bottom 75 extends toward the bottom wall of chamber 77, thereby forming a small gap 83 at the bottom of tube 81. Chamber 76 is optionally provided with an exhaust outlet near the bottom of wall 74.

Referring to FIG. 4, housing means 85 and 86, which are disposed upon cover 84, define feed chamber 87 and isolation chamber 88, respectively. The upper walls of means 85 and 86 are provided with openings 89 and 90, respectively, through which optical fiber 73 passes. Tube 91 extends through cover 84, and its top end fits within an enlarged portion of opening 89. That portion of tube 91 within feed chamber 87 contains one or more sets of feed holes 92, five sets of holes being shown. Reactant gas is supplied to chamber 87 through inlet 94, and inert gas is supplied to chamber 88 through inlet 95. In this embodiment, the distance c is measured from tip 93 to the middle set of the feed holes 92.

Another preferred embodiment is shown in FIG. 6 wherein vessel side wall 98, top cover 99 and bottom cover 100 form receiving chamber 97. Exhaust gases are removed from chamber 97 through outlet pipe 101.

A lower isolation chamber housing 103, having an axial bore 109, is attached to bottom cover 100. The upper portion 111 of housing 103 protrudes upwardly into chamber 97. If any oily reactant product deposits on bottom wall 100, portion 111 will prevent the deposit from running into bore 109 before the deposit chars to a solid material. A first lower isolation chamber 102, which is located in the upper portion of housing 103, has an inlet 104 for supplying inert gas thereto. Second lower isolation chamber 105, which is located in the lower portion of housing 103, has an inlet 106 for supplying inert gas thereto. Chambers 102 and 105 communicate with bore 109 at annular slots 107 and 108, respectively. The cross-sectional area of each of the chambers 102 and 105 decreases with decreasing radius, whereby these chambers function as nozzles that provide relatively high velocity gas streams. Chamber 102 intersects bore 109 at such an angle that inert gas such as nitrogen flows from slot 107 at an upward direction. This nitrogen flow reduces the flow of reactants and reaction products from chamber 97 into bore 109. Chamber 105 intersects bore 109 at such an angle that inert gas such as helium flows from slot 108 at a downward direction. This helium flow reduces the flow of air into bore 109 and cools the fiber.

An upper chamber housing 119, having an axial bore 120, is attached to top cover 99. Upper isolation chamber 121, which is located in the upper portion of housing 119, has an inlet 122 for supplying inert gas thereto. Feed chamber 124, which is located in the lower portion of housing 119, has an inlet 125 for supplying reactant gas thereto. Chambers 121 and 124 communicate with bore 120 at annular slots 123 and 126, respectively. The cross-sectional area of each of the chambers 121 and 124 decreases with decreasing radius, whereby these chambers function as nozzles that provide relatively high velocity gas streams. Chambers 121 and 124 intersect bore 120 at angle such that gas flows therefrom in an upward direction. Whereas chamber 124 is shown as being angled upwardly, it could be angled downwardly or be orthogonally disposed with respect to fiber 118.

The following examples illustrate the quality of the carbon coatings produced by the apparatus of the invention and the improvement experienced in the operation of that apparatus. In each of these examples, the distance between the center of the draw furnace and the top of the reactor was 33 cm. The described apparatus is capable of operating at draw speeds between 5 and 11 meter/sec. In the specific examples described below, the draw rates are 9 meters/sec. When different draw rates are employed, the flow rates must be adjusted accordingly. All of the following examples involve the coating of 125 $\mu$m diameter fibers. If larger diameter fibers are employed, the fiber temperature is higher, and shorter lengths of fiber can be drawn without reactor clogging.

Reactor A

A reaction chamber was constructed in accordance with the embodiment described in conjunction with FIGS. 4 and 5. Chamber 88 had a diameter of 2.9 cm and an axial length of 1.5 cm. Chamber 87 had a diameter of 2.9 cm and an axial length of 2.4 cm. The diameter of opening 90 was 4 mm. Chamber 76 had a diameter of 6.4 cm and an axial length of 25.4 cm. Chamber 77 had a diameter of 6.4 cm and an axial length of 5 cm. The lengths of tubes 79 and 81 were 1.9 cm and 4.9 cm, and their inside diameters were 0.7 cm. Gap 83 was about 1 mm. Tube 91 had an ID of 5 mm and an outside diameter of 8.9 mm. The axial spacing between sets of holes 92 was 5 mm. Each of the five sets of holes contained 8 holes of 0.109 cm diameter; the total cross-sectional area of the 40 holes was 0.375 cm$^2$. Tube 91 extended 4.5 cm beyond cover 84 into chamber 76, and the distance c was 6.5 cm. An exhaust was located 5 cm from the bottom of chamber 76.

The flow rate of methyl acetylene into chamber 87 ranged between 0.1 to 0.4 slpm. There was some instability at 0.1 slpm, and therefore, fatigue was not good. A reactant gas flow rate of 0.15 was the minimum flow rate for achieving acceptable fatigue, and 0.2 slpm was the preferred flow rate for good fatigue and good hydrogen barrier. Flow rates higher than 0.4 slpm gave lower strength and shorter runs. Nitrogen was flowed into chambers 77 and 88 at 2.0 slpm. Exhaust flow was 1.5 slpm.

Some glassy carbon formed on the outer surface of tube 91 and on the surfaces forming vessel 76. Optical fiber was routinely coated with carbon in 110 km lengths without the occurrence of a buildup sufficient to hinder the draw process or the hermetic and strength properties of the fiber. The 110 km length was limited by the amount of fiber that could be drawn from the preform.

In an initial design of Reactor A, the extension of tube 91 into chamber 76 was initially greater so that distance c was 10 cm. A buildup occurred within the end of tube 91 that extended into chamber 76. When the distance c was reduced to 6.2 cm, no significant buildup occurred.

When tube 91 was removed so that reactant gas flowed onto the fiber from inlet 94, the reaction could not be stabilized, and a carbon buildup occurred within chamber 87.

Reactor B

A further reaction chamber was constructed in accordance with the embodiment described in conjunction with FIGS. 4 and 5. Chamber 88 had a diameter of 2.7 cm and an axial length of 1.3 cm. Chamber 87 had a diameter of 2.7 cm and an axial length of 4.9 cm. The diameter of opening 90 and the ID of tube 91 were the same as in reaction chamber A. The wall thickness of tube 91 was 1 mm. Chamber 76 had a diameter of 5.1 cm and an axial length of 45 cm. Chamber 77 had a diameter of 5.1 cm and an axial length of 5.1 cm. The lengths of tubes 79 and 81 were 4.9 cm and 5.1 cm, and their diameters were 0.9 cm. Gap 83 was about 2 mm. The axial spacing between sets of holes 92 was 5 mm. Each of the 11 sets of holes contained 8 holes of 0.109 cm diameter; the total cross-sectional area of the 88 holes was 0.821 cm$^2$. Tube 91 extended 2.5 cm beyond cover 84 into chamber 76, and the distance c was 5.7 cm. There was no exhaust in chamber 76.

The flow rate of methyl acetylene into chamber 87 ranged between 0.1 to 0.2 slpm. A flow rate of 0.1 slpm was the minimum flow rate for achieving good fatigue, and 0.15 slpm was the preferred flow rate for good fatigue. Reactant gas flow rates higher than 0.2 slpm resulted in lower strength. Nitrogen was flowed into chambers 77 and 88 at 2.0 slpm.

Some glassy carbon formed on the outer surface of tube 91 and on the surfaces forming vessel 76. Since this reactor is in the early stages of development, it has not been used to produce long run lengths. However, since no buildup has been observed, it is expected to yield lengths in excess of 100 km.

Reaction Chamber C

A reaction chamber was constructed in accordance with the embodiment described in conjunction with FIG. 6. Chamber 97 had a diameter of 6.4 cm and an axial length of 25 cm. The distance from the bottom tip of housing 103 to cover 100 was 7 cm. The distance from the tip of housing 119 to cover 99 was 5.5 cm. The distance from the bottom tip of housing 127 to cover 99 was 2.9 cm. The diameter of bores 109 and 120 were 5 mm. Exhaust 101 was 1 cm above bottom wall 100. Each chamber 104, 105, 121 and 124 had a maximum radius of 1.27 cm where the height was 5 mm. The cone that passed through the center of each of the chambers 104, 105, 121 and 124 made an angle of about 50° with respect to the axis of fiber 118. The axial length of each of the slots 107, 108, 123 and 126 was 0.68 mm, and the circumference of each annulus was 1.588 cm, whereby the total area of the slot was 0.108 cm. The distance c (the distance between slot 126 and tip 129 was 5.6 cm. The distance between slot 123 and the upper tip of housing 119 was 1.7 cm.

The flow rate of methyl acetylene into chamber 124 ranged between about 0.3 and 1.0 slpm for achieving good fatigue and hydrogen barrier, and 0.4 slpm was the preferred flow rate for good fatigue and hydrogen barrier. Reactant gas flow rates higher than 1.0 slpm resulted in lower strength and shorter runs. Nitrogen was flowed into chambers 102 and 121 at 0.2 slpm and 2 slpm, respectively. Helium flowed into chamber 105 at 2 slpm. The exhaust flow from outlet 101 was 1.5 slpm.

An oily film initially formed on the outer surface of housing 127 (outside bore 128), the walls 98 of chamber 97 and top and bottom walls 99 and 100. This film charred to a solid coating that did not interfere with the fiber drawing process. There was no substantial buildup of reaction product on the surface of bore 128; although a mild discoloration was sometimes seen there. Optical fiber was routinely coated with carbon in 80 km lengths without the occurrence of a buildup sufficient to hinder the draw process or the hermetic and strength properties of the fiber. The 80 km length was not limited by the reactor; rather, it was limited by the amount of fiber that could be drawn from the preform.

Both the coating thickness and its structure affect hermiticity. If two fibers produced by the same draw and coating reactor had different coating thicknesses, the fiber having the thinner coating was stronger. However, some minimum thickness is needed for hermiticity. The hydrogen barrier factors of coatings produced in Reactors A and C were 0.00 to 0.05, in dB/km after the 20 day test at 85° C. in 11 atmospheres hydrogen. All fibers produced by reactors have n-values greater than 100, and n is usually greater than 200.

We claim:

1. A method for producing a carbon coated optical fiber comprising the steps of drawing an optical fiber from a heated glass body and through a reaction tube, the inside diameter of which is between about 0.3 and 1.0 cm, flowing reactant gas into said tube and onto said fiber where it reacts to form a carbon coating on said fiber and to form reaction products, and flowing said reactant gas and reaction products in the direction of movement of said fiber and out of an end of said tube and into a controlled atmosphere, the length of said tube being such that there is no substantial buildup of reaction product therein.

2. A method in accordance with claim 1 wherein the step of flowing reactant gas into said tube comprises flowing said reactant gas through a feed chamber and thereafter through gas feed means that directs at least one annular flow of reactant gas onto said fiber.

3. A method in accordance with claim 2 wherein the step of flowing said reactant gas through gas feed means comprises flowing said reactant gas onto said fiber orthogonally with respect to the axis of said fiber.

4. A method in accordance with claim 2 wherein the step of flowing said reactant gas through gas feed means comprises flowing said reactant gas onto said fiber in a direction that is non-orthogonal with respect to the axis of said fiber.

5. A method in accordance with claim 1 wherein the step of flowing reactant gas into said tube comprises flowing said reactant gas through a feed chamber and thereafter through gas feed means that directs a plurality of axially spaced annular flows of reactant gas onto said fiber.

6. A method in accordance with claim 1 wherein the step of flowing said reactant gas and reaction products in the direction of movement of said fiber comprises moving said fiber from said reaction tube to a receiving chamber having a diameter larger than that of said reaction tube, at least some of said reaction product depositing on the surface of said receiving chamber.

7. A method in accordance with claim 1 wherein the step of drawing comprises drawing said optical fiber through a reaction tube having an inside diameter between 0.3 and 1.0 cm.

8. A method in accordance with claim 7 wherein the step of drawing comprises drawing said optical fiber through a reaction tube, the dimensions of which are such that the distance between that end of said tube from which said gases exit and the average point of injection of reactant gas into said tube is between 3 and 10 cm.

9. A method in accordance with claim 1 wherein the step of flowing said reactant gas and reaction products in the direction of movement of said fiber and out of an end of said tube and into a controlled atmosphere is such that said reactant gas continues to react as it flows through said tube and after it exits said tube.

10. A method for producing a carbon coated optical fiber comprising the steps of drawing an optical fiber from a heated glass body, moving said drawn fiber through a tube, the maximum inside diameter of which is about 1.0 cm, and the minimum inside diameter of which is sufficiently large that said tube is not contacted by said fiber, flowing a reactant gas having a carbonaceous composition into said tube, said fiber having a temperature sufficiently high to cause a reaction that forms (a) an adherent carbon coating on said fiber and (b) reaction product, and flowing said reactant gas and reaction product through said tube in the direction of movement of said fiber and from an end of said tube and into a receiving chamber having an inner diameter larger than that of said tube.

11. A method in accordance with claim 10 wherein the step of flowing said reactant gas into said tube comprises flowing said reactant gas through a feed chamber and thereafter through gas feed means that directs at least one annular flow of reactant gas onto said fiber.

12. A method in accordance with claim 10 wherein the step of flowing said reactant gas into said tube comprises flowing said reactant gas through a feed chamber and thereafter through gas feed means that directs a plurality of axially spaced annular flows of reactant gas onto said fiber.

13. A method in accordance with claim 10 further comprising the step of moving said fiber from said receiving chamber through an isolation chamber that restricts the flow of ambient air into said receiving chamber.

14. A method in accordance with claim 13 further comprising the step of exhausting gases from said receiving chamber.

15. A method in accordance with claim 10 wherein the inside diameter of said tube is at least about 0.3 cm.

16. A method in accordance with claim 10 wherein said tube extends a finite distance into said receiving chamber.

* * * * *